(12) United States Patent
Andrea et al.

(10) Patent No.: US 8,824,539 B2
(45) Date of Patent: Sep. 2, 2014

(54) SYSTEM AND METHOD FOR OFDM RECEPTION IN THE PRESENCE OF DOOPPLER EFFECT BASED ON TIME DOMAIN WINDOWING

(75) Inventors: Ancora Andrea, Nice (FR); Giuseppe Montalbano, Villeneuve Loubet (FR)

(73) Assignee: ST Ericsson SA, Plan-les-Ouates (CH)

( * ) Notice: Subject to any disclaimer, the term of this patent is extended or adjusted under 35 U.S.C. 154(b) by 329 days.

(21) Appl. No.: 13/256,414

(22) PCT Filed: Mar. 11, 2010

(86) PCT No.: PCT/EP2010/001557
§ 371 (c)(1),
(2), (4) Date: Nov. 21, 2011

(87) PCT Pub. No.: WO2010/102829
PCT Pub. Date: Sep. 16, 2010

(65) Prior Publication Data
US 2012/0057628 A1    Mar. 8, 2012

(30) Foreign Application Priority Data
Mar. 13, 2009   (EP) .................................... 09368007

(51) Int. Cl.
| | | |
|---|---|---|
| H04L 27/06 | (2006.01) | |
| H04L 27/01 | (2006.01) | |
| H04L 25/03 | (2006.01) | |
| H04L 27/26 | (2006.01) | |

(52) U.S. Cl.
CPC ...... H04L 27/2647 (2013.01); H04L 25/03248 (2013.01); *H04L 2025/03445* (2013.01)
USPC ............ 375/233; 375/229; 375/230; 375/340

(58) Field of Classification Search
USPC .......................................... 375/229–236, 340
See application file for complete search history.

(56) References Cited

U.S. PATENT DOCUMENTS 7,292,647 B1 * 11/2007 Giannakis et al. ............ 375/295
7,782,924 B1 *  8/2010 Chiang et al. ................. 375/130
(Continued)

FOREIGN PATENT DOCUMENTS

| EP | 1043875 A | 10/2000 |
|---|---|---|
| EP | 1860810 A | 11/2007 |

OTHER PUBLICATIONS

Patent Cooperation Treaty International Search Report and Written Opinion for PCT/EP2010/001557; May 20, 2010; 10 pages.

(Continued)

*Primary Examiner* — Shuwang Liu
*Assistant Examiner* — Ross Varndell
(74) *Attorney, Agent, or Firm* — Howison & Arnott L.L.P.

(57) ABSTRACT

An OFDM receiver for processing an OFDM received signal to perform OFDM reception in presence of Doppler effects is provided. The receiver has at least two parallel processing chains, each processing chain has a time domain windowing for processing an OFDM block. The processing consisting of the multiplication, element by element of the OFDM block, by a set of predetermined coefficients.
The receiver also has a DFT block (such as FFT) for demodulating said windowed OFDM symbol into the frequency domain equivalent wherein the windowings of the at least two parallel processing chains have complementary profiles so as to avoid any loss of information throughout the OFDM sample. The invention also provides a process to be used in an OFDM receiver.

8 Claims, 11 Drawing Sheets

(56) References Cited

U.S. PATENT DOCUMENTS

| | | | | |
|---|---|---|---|---|
| 8,054,917 | B2* | 11/2011 | Huang et al. | 375/340 |
| 2006/0008017 | A1* | 1/2006 | Balakrishnan et al. | 375/260 |
| 2008/0031375 | A1* | 2/2008 | Zhou et al. | 375/267 |
| 2012/0002703 | A1* | 1/2012 | Yamashita et al. | 375/133 |

OTHER PUBLICATIONS

Patent Cooperation Treaty International Preliminary Report on Patentability for PCT/EP2010/001557; Sep. 13, 2011; 7 pages.

* cited by examiner

SYSTEM AND METHOD FOR OFDM RECEPTION IN THE PRESENCE OF DOOPPLER EFFECT BASED ON TIME DOMAIN WINDOWING

CROSS-REFERENCE TO RELATED APPLICATIONS

This application is a U.S. National Phase application submitted under 35 U.S.C. §371 of Patent Cooperation Treaty application serial no. PCT/EP2010/001557, filed Mar. 11, 2010, and entitled SYSTEM AND METHOD FOR OFDM RECEPTION IN THE PRESENCE OF DOPPLER EFFECT BASED ON TIME DOMAIN WINDOWING, which application claims priority to European patent application serial no. EP 09368007.2, filed Mar. 13, 2009, and entitled SYSTEM AND METHOD FOR OFDM RECEPTION IN THE PRESENCE OF DOPPLER EFFECT BASED ON TIME DOMAIN WINDOWING.

Patent Cooperation Treaty application serial no. PCT/EP2010/001557, published as WO 2010/102829, and European patent application serial no. EP 09368007.2, are incorporated herein by reference.

TECHNICAL FIELD

The invention relates to the field of wireless digital communications and more particularly to a process for processing a OFDM received signal to perform OFDM reception in presence of Doppler, based on a time domain windowing.

BACKGROUND

Digital wireless communications are being widely used throughout the world particularly with the latest development of the Orthogonal Frequency Division Multiplex (OFDM systems) and the latest evolution, namely the so-called Long Term Evolution (LTE), DVB-H, WiFi 802.11 and WiMax 802.16 systems. It is well-known by one skilled in the art that OFDM communication systems performances are severely impaired by the rising of inter-carrier interference (ICI) effect in the presence of time-varying propagation channels. Such circumstances occur in mobile cellular OFDM communication systems envisioned in the above mentioned standards.

It is well-known that classical OFDM low-complexity detection techniques are severely impaired when the user equipment (UE) moves at high velocity. These conditions result in fast time-varying propagation channels and a high Doppler spread, which in turn yields to significant ICI. The so increased ICI prevents classical OFDM receiver schemes from reliably detecting the desired signal. Hence more advanced receiver equalization techniques are required to mitigate the effect of the ICI.

It is also well-known from the literature that a solution to the above ICI mitigation-equalization optimization problem is readily found when the receiver includes the complexity of a full matrix inversion. In existing telecommunication systems, such a full channel matrix inversion operation cannot be supported by a practical mobile receiver.

Hence several approaches have been introduced to reduce the complexity of the above optimization problem. To this end the use of time-domain windowing of the OFDM symbol has been shown to limit the span of inter-carrier interference and allow for frequency-domain iterative detection exploiting the voluntarily-generated banded nature of the new channel matrix.

Figure 1:
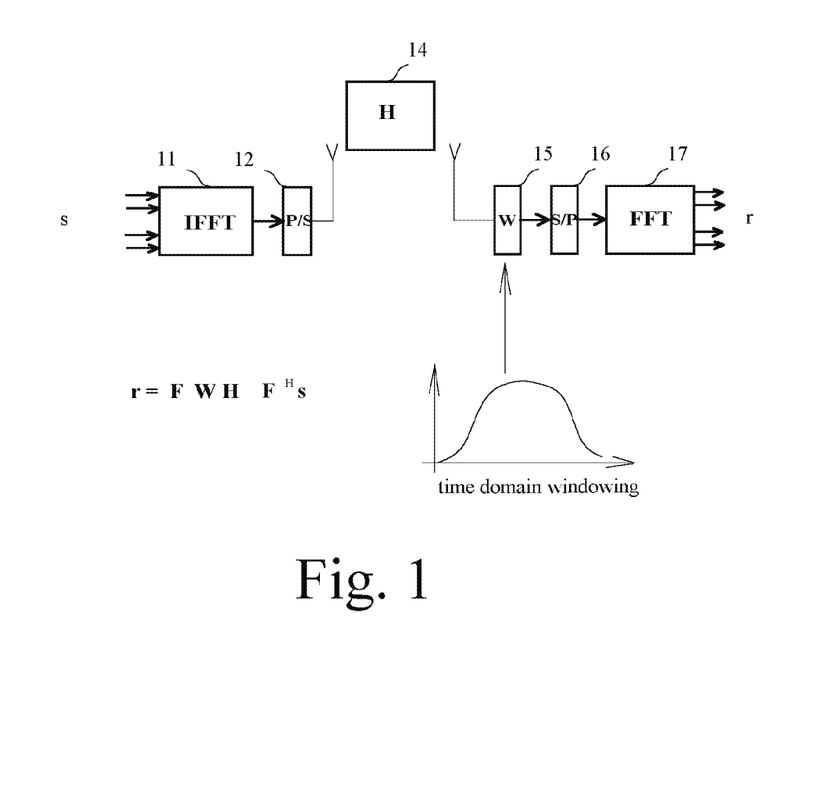
FIG. 1 illustrates the general principle of a prior art technique using one time domain windowing.

FIG. 1 illustrates the general principle of a prior art technique using a time domain window. One sees that, in the transmitter part of the OFDM system, the frequency domain signal s is being converted in the time domain by means of a inverse Fourier Transform block 11 before being serialized by a parallel to serial block 12 and transmitted through a propagation channel represented by block H. In the receiver, a time domain windowing is applied on the signal received from the antenna before the serial to parallel conversion by a block 15 and the Fourier transform by block 16. Time domain windowing is based on the multiplication of the samples of one Block by coefficients embodying a window. Such operation has the effect of controlling the inter-carrier interference (ICI), i.e. the interference among different subcarriers, and causes the limitation of the span of the matrix FWHFH between the transmitted sequence s and the received signal r.

$$r=FWHF^H s$$

The result is that equalization is facilitated via a span limited matrix.

However this known technique has a serious drawback in that the time domain window results in a loss of energy of the received signal due to the suppression of some samples of the received signal.

Figure 2:
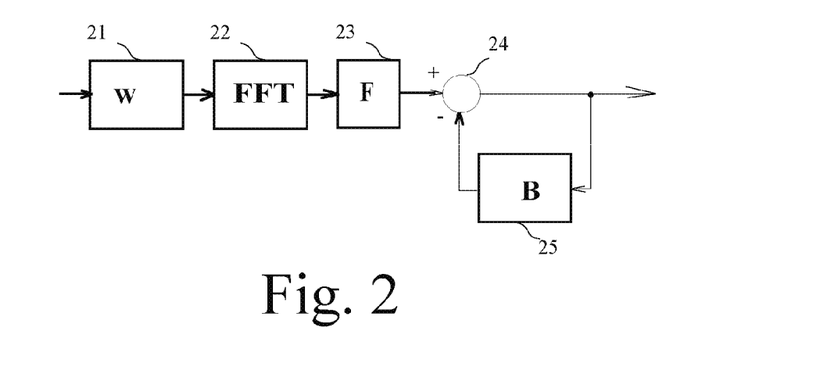
FIG. 2 shows an equivalent model of a prior art technique.

FIG. 2 shows an equivalent model of a prior art technique which, consists of a time domain windowing block 21, a Fast Fourier transform block 22, and then is followed by a Decision Feedback Equalizer embodied by a forward filter 23, adder-subtractor 24 and a backward filter 25 arranged in a feedback loop. The loss of information resulting from the time domain windowing has the result of jeopardizing the convergence of the equalizing process.

Such a technique becomes unsatisfactory when the Doppler effects are increased because of the loss of information resulting from the time domain windowing being performed.

Such are the technical problems addressed by the present invention.

SUMMARY

Embodiments of the present invention provide a OFDM receiver that yields optimal detection performance for the desired signal by means of complexity-effective inter-carrier interference (ICI) cancellation.

Embodiments of the present invention provide a OFDM receiver that includes time domain windowing and provides fast convergence of the equalization process.

Additional embodiments of the invention provide a process that is adapted to carry out an OFDM receiver, such as, for instance, a LTE communication system.

These and other objects of the invention are carried out by means of a OFDM receiver for processing a OFDM received signal to perform OFDM reception in presence of Doppler which comprises at least two parallel processing chains, each comprising:

a time domain windowing for processing a OFDM block, said processing consisting in the multiplication, element by element of said OFDM block, by a set of predetermined coefficient, a DFT block such as FFT for demodulating said windowed OFDM symbol into the frequency domain equivalent, Because of the complementary profiles of the at least two windowing operations applied in the time domain, the processing of the signal received from the communication system can be done without loss of data, which guarantees the use of the maximum energy of the received signal.

In one embodiment, the OFDM receiver includes a linear multipath equalizer and detector, which receives the output of the parallel processing chains and outputs an estimated sequence of transmitted data.

In one embodiment, the receiver includes a feedback loop comprising a Inverse Fourier Transfer block and a block corresponding to the estimated channel H of the propagation channel. A cancellation loop is arranged in the time domain field, based on a subtractor (31) subtracting the output of the feedback loop to the received signal before it is passed to the at least two windowing paths.

This cancellation loop performed at the time domain level, allows fast convergence of the equalization process.

In practical circumstances, as a particular embodiment, an OFDM receiver comprising only two parallel time domain windowing processes having complementary profiles is shown to provide nearly optimal performances at limited complexity.

In particular, two parallel time domain windows processes allows the complexity of the receiver to be reduced (of the order N×log 2N) which is significantly less than the complexity (N×N) resulting from a full N×N matrix inversion.

In one embodiment, the linear multipath equalizer and detector includes a multipath Decision Feedback Equalization (DFE).

Alternatively, the linear multipath equalizer and detector can include a multipath MMSE equalizer.

In one embodiment, the linear multipath equalizer and detector includes channel code detection such as Turbo or Viterbi decoding means for decoding the data before it is passed to the feedback loop.

The invention embodiments may also provide a method for processing an OFDM received signal to perform OFDM reception in the presence of Doppler spread, comprising the following steps:
  subtracting the received signal in the time domain with the output of a feedback loop comprising a IFFT block and a channel estimate (H) block;
  inputting the output of said subtractor to at least two parallel processing chains, comprising each:
    a time domain windowing step for processing a OFDM block, said processing consisting of the multiplication, element by element of said OFDM block, by a set of predetermined coefficients,
    a DFT step (such as FFT) for demodulating said windowed OFDM symbol into the frequency domain equivalent, the windowings of said at least two parallel processing chains have complementary profiles so as to avoid any loss of information throughout the OFDM sample.
  applying a linear multipath equalization and detection process for the purpose of generating an estimate of the transmitted sequence to be forwarded to said feedback loop.

Embodiments of the invention are suitable for the realization of mobile receivers for LTE, DVB-H, Wifi 802.11 and WiMax 802.16.

BRIEF DESCRIPTION OF THE DRAWINGS

Other features of one or more embodiments of the invention will best be understood by reference to the following detailed description when read in conjunction with the accompanying drawings.

DETAILED DESCRIPTION

An embodiment of the invention is suitable for any OFDM receiver, and more particularly suitable for LTE-A product, such as complying with the 3GPP standard specification.

Figure 3:
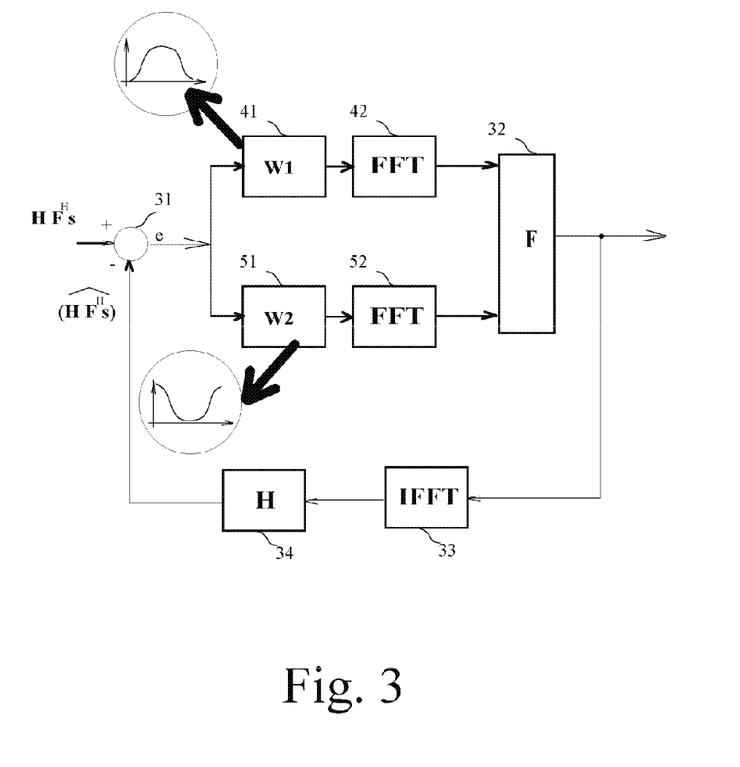
FIG. 3 illustrates one embodiment of a OFDM receiver in accordance with the present invention based on two parallel time domain windowing processes.

FIG. 3 shows the general architecture of one embodiment of an exemplary OFDM receiver.

The signal received from the antenna is $$HF^{H}s$$

with s being the transmitted frequency domain sequence, FH being the inverse Fourier Transform applied in the transmitter and H being the propagation channel.

Embodiments comprise a feedback loop arranged in the time domain level, based on a subtractor 31 having a first input receiving the Hx FH s signal from the antenna and a second input receiving the output of a feedback loop of blocks 33 (Inverse Fast Fourier Transform) and 34 (Channel estimate H).

In addition to subtractor 31, the receiver comprises at least a first and a second path comprising each a time domain windowing block associated with its own Discrete Fourier Transform or DFT (or FFT). One key point of the present invention resides in the fact that a different time domain windowing is arranged in such a way so as to prevent any loss of information in the received signal. For that purpose, the windowings are chosen so as to provide complementary profiles.

For the sake of clarity, FIG. 3 illustrates a two windowing process, respectively based on a first windowing block W1 41 embodying a first concave profile (represented in the figure) and a second windowing block W2 51 embodying a second convex profile (illustrated in the figure).

It can be seen that the two profiles being illustrated in the figure result in the fact that no samples in the OFDM block is being lost and the two different paths, respectively based on blocks 41-42 and 51-52 provide a full and comprehensive information, without any loss to a Block 32.

Block 32 embodies a linear multi-path equalizer and estimation block that may use any conventional equalization technique, such as a Decision Feedback Equalization (DFE), Minimum.Mean.Square Error (MMSE) Equalization. The point is that Block 32 receives information from at least two parallel processing paths or channels (resp. 41-42 and 51-52).

Alternatively, Block 32 may include a detector based on turbo code decoding as well as some preconditioning algorithms in order to facilitate convergence of the equalizing and detection process.

In any case, it can be seen that the general architecture of the receiver, which is based on at least two complementary windowing profiles, significantly facilitates the equalizing process because it helps avoid loss of information in the receiver.

The receiver further comprises, in order to complete the feedback loop, a inverse Fourier Transform block IFFT 33 followed by a block 34, which comprises the estimate of the channel H. Estimation of the channel in block 34 is performed by means of conventional techniques based on the use of pilot signals as known by a skilled man.

It can therefore be seen that the invention provides an adaptive feedback loop, surprisingly arranged in the time domain level, which is quite novel. Such a feedback loop has the drawback of requiring two FFT blocks (resp. 42 and 52) and one IFFT (33), but has the significant advantage of facilitating the equalizing process due to the avoidance of the loss of any information due to the time domain windowings performed.

This results in the possibility of properly processing the Doppler effect without requiring a significant amount of digital processing resources. For instance, implementing a full N×N matrix inversion would lead to a complexity of the order of $N^2$ while, with exemplary embodiments of the invention, the complexity remains reasonable since it is only proportional to N×log 2.

This low complexity is achieved without the loss of any information, which can not be prevented with known prior art techniques that are based on one single time domain windowing and a feedback loop located within the frequency domain only.

FIGS. 4-9 illustrate the application of the principle of the invention to P parallel paths, each associated with a given time domain window.

Figure 4:
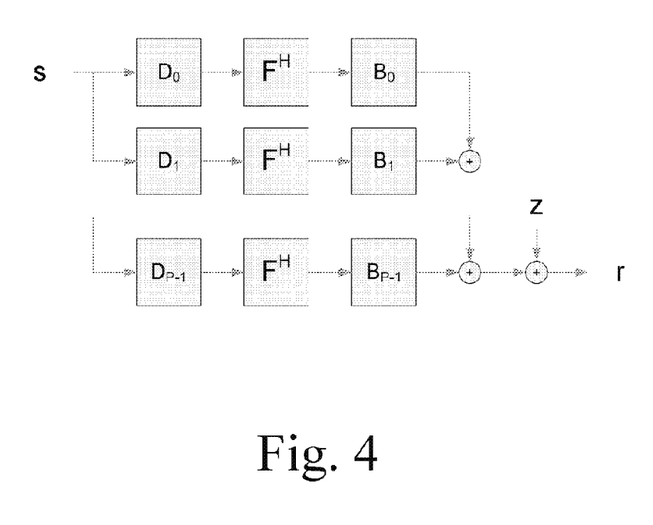
FIG. 4 shows an equivalent Basis Expansion Model of a transmitter and of a propagation channel to provide a time domain received signal.

FIG. 4 shows equivalent model of the OFDM transmitter and the time-varying propagation channel plus noise cascade HxFHxs+z in a Basis Expansion Model form. In fact the cascade of HxFH can be equivalently written as the sum of the combination of several branches, each comprising the cascade of a diagonal matrix Dp, an inverse Fourier transform FH and a basis function corresponding to the diagonal matrix Bp. Moreover the basis function Bp can be seen as an equivalent transmitter windowing operation.

D0, D1, . . . DP-1 represent the channel coefficients for each basis function B0, B1, . . . BP-1. z represents the additive noise, s is the transmitted sequence and r the received signal.

Figure 5:
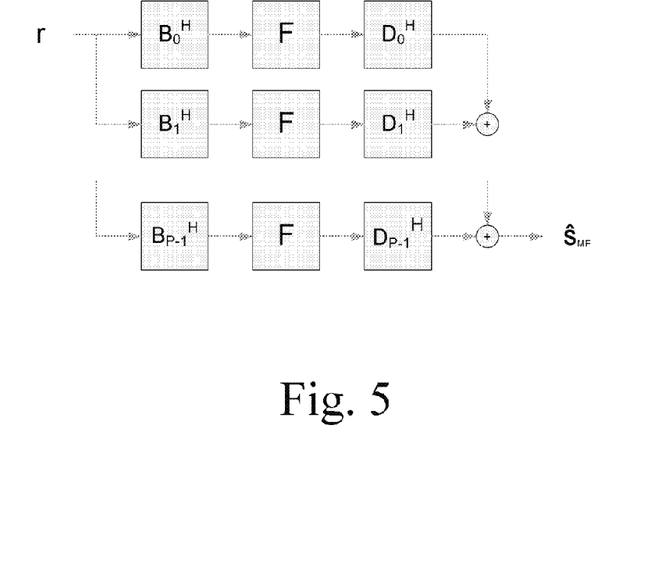
FIG. 5 shows a classical OFDM Matched filter receiver operating on several branches that correspond to several time-domain windowing processes.

FIG. 5 shows a classical Matched Filter (MF) OFDM receiver in its Basis Expansion Model form. This receiver is one possible arrangement for estimating the $\hat{s}_{MF}$ from the received signal r. This figure shows how the equivalent transmitter model of FIG. 4 is exploited in the receiver structure, the classical Matched Filter in this case. BH0, BH1, . . . BHP-1 represent the conjugate transpose diagonal matrix of the basis function B0, B1, . . . BP-1 at the transmitter of FIG. 4. BH0, BH1, . . . BHP-1 are exactly equivalent to the time-domain windowing operations W1 and W2 of FIG. 2 where only two basis are showed (Hence W1=BH0 and W2=BH1). DH0, DH1, . . . DHP-1 represent the conjugate transpose channel coefficients for each basis function B0, B1, . . . BP-1 r is the received signal and $\hat{s}_{MF}$ is the estimated sequence according to the Matched Filter criterium.

Figure 6:
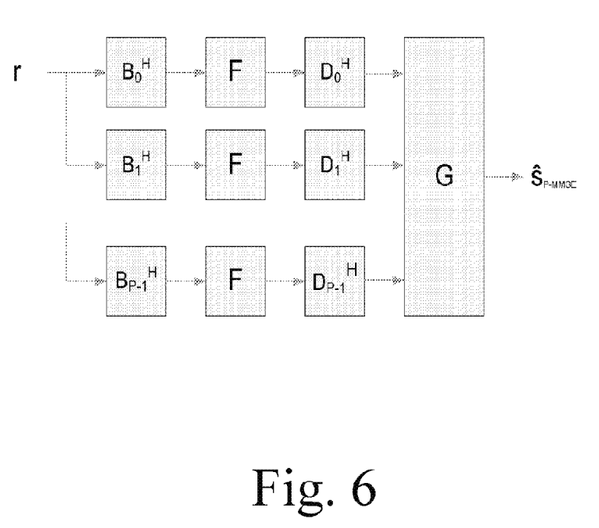
FIG. 6 shows an improved OFDM receiver that performs Inter Carrier Interference cancellation operating on several time-domain windowing branches

FIG. 6 shows the equivalent model providing the estimation of $\hat{s}_{P-MMSE}$ in the case of a P multipath time domain windowing corresponding to the Basis Expansion Model as in previous figure, but for an improved detection technique based on MMSE equalization and is able to cancel Inter Carrier Interference. Again, BH0, BH1, . . . BHP-1 represent the conjugate transpose diagonal matrix of the basis function B0, B1, . . . BP-1 at the transmitter of FIG. 4 and DH0, DH1, . . . DHP-1 represent the conjugate transpose channel coefficients for each basis function B0, B1, . . . BP-1. G denotes the ICI cancelling MMSE filter and $\hat{s}_{P-MMSE}$ the estimated transmitted sequence.

Figure 7:
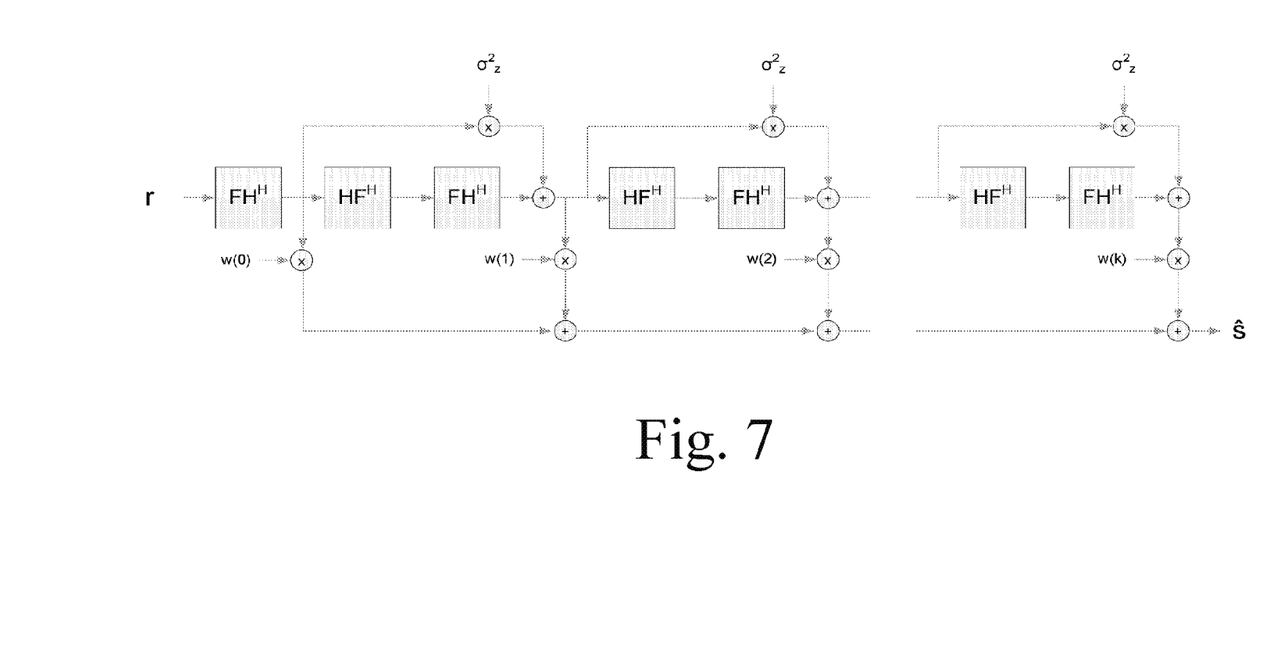
FIG. 7 shows an implementation of an iterative receiver in the frequency-domain based on the exemplary improved OFDM receiver performing ICI cancellation in an open format.

FIG. 7 shows the implementation of an iterative receiver in its open form exploiting the Basis Expansion Model of the channel and the multi-windowing approach based on Matched Filtering. The blocks U is exactly equivalent to the multi-branch representation given in FIG. 5. Therefore U=D0xFHxB0+D1xFHxB1+. DP-1xFHxBP-1. UH is its transpose conjugate, i.e. UH=DH0xFxBH0+DH1xFxBH1+. DHP-1xFxBHP-1. $\sigma^2$ represents the knowledge of the noise variance or an estimate if available. w(0) . . . w(K) represent some combining weighting factors used to retrieve the final transmitted sequence estimate ŝ.

Figure 8:
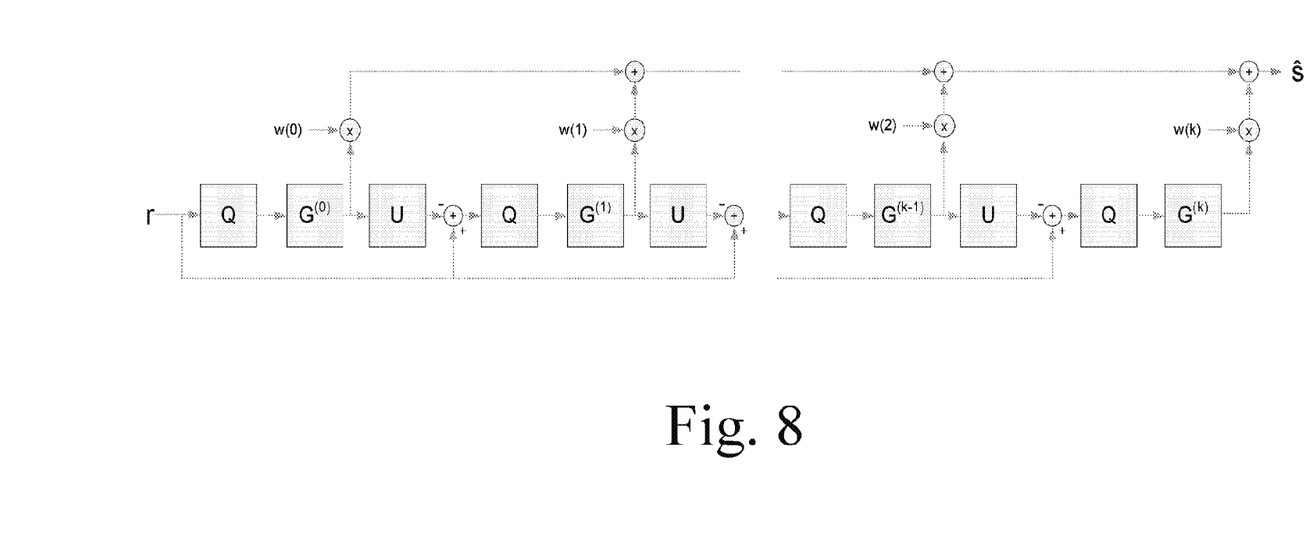
FIG. 8 shows the implementation of an iterative receiver in the time-domain based on an exemplary improved OFDM receiver performing ICI cancellation in open format.
Figure 9:
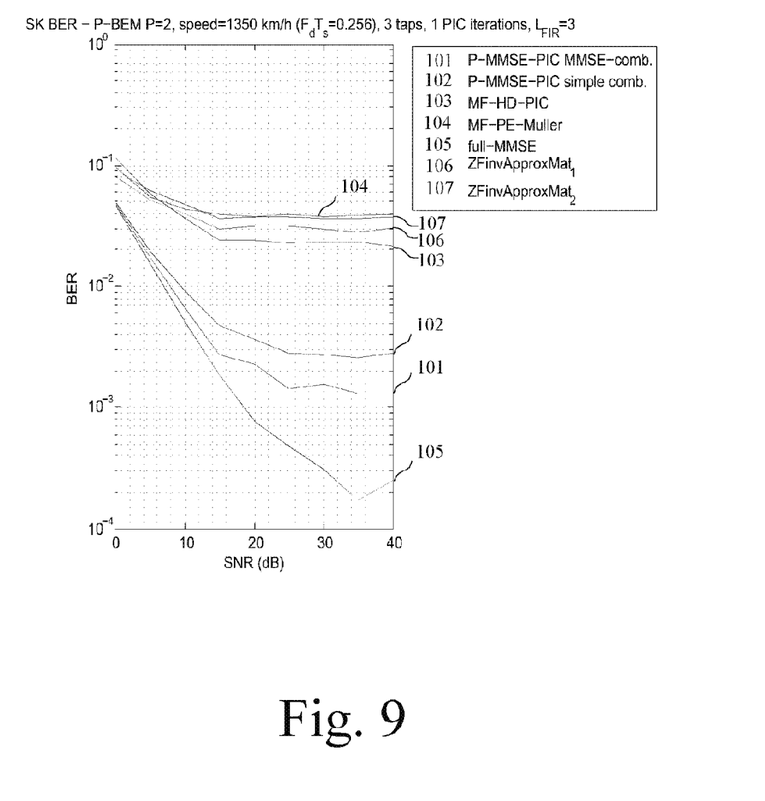
FIGS. 9-12 show the results of simulations of embodiments the present invention in four particular situations.
Figure 10:
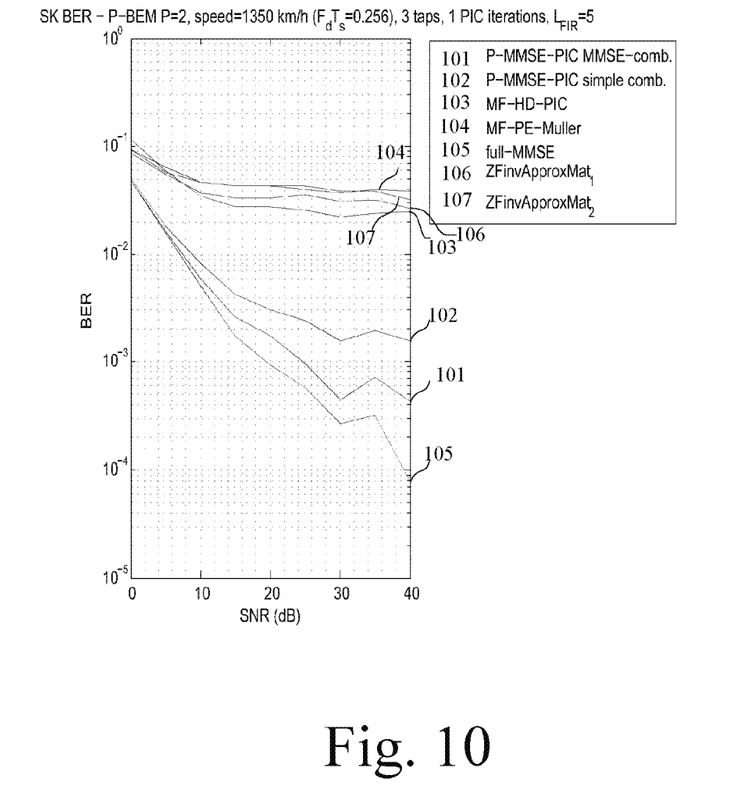
Figure 11:
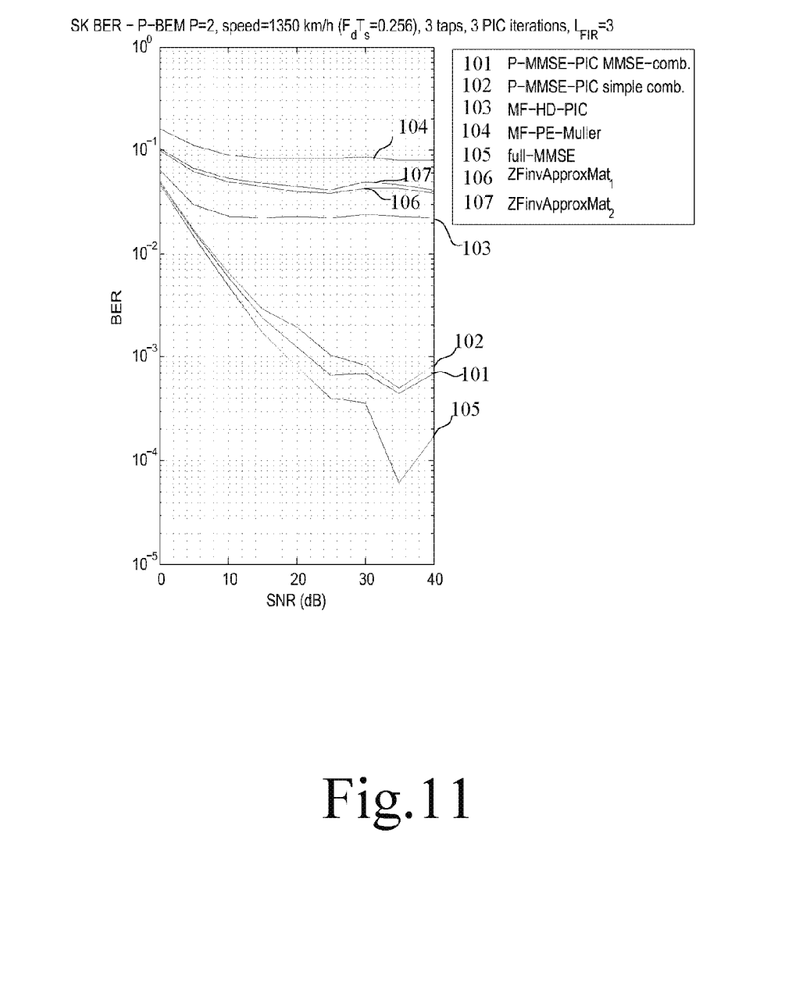
Figure 12:
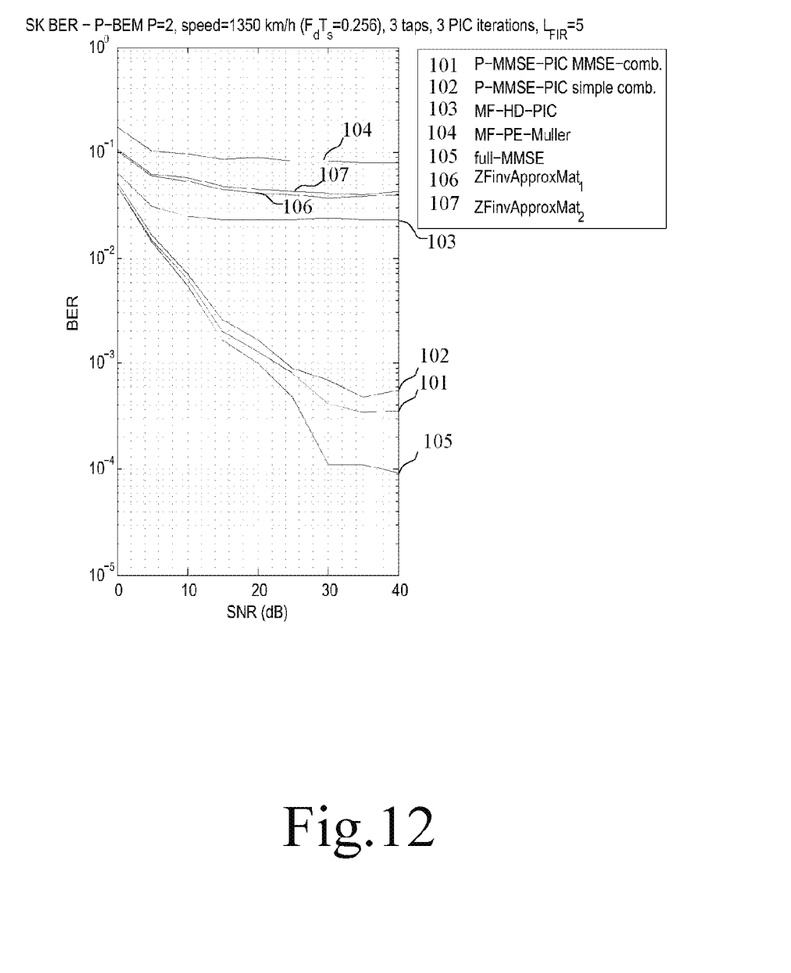

FIG. 8 shows the implementation of an iterative receiver in its open form exploiting the Basis Expansion Model of the channel and the multi-windowing approach based on MMSE filtering. The blocks U denotes again the multi-branch representation given in FIG. 5. Therefore U=D0xFHxB0+D1xFHxB1+. DP-1xFHxBP-1. Q denotes a partial matched filter operation, more precisely Q=[FxBH0; DH1xFxBH1; . . . ; FxBHP-1]. w(0) . . . w(K) represent some combining weighting factors used to retrieve the final transmitted sequence estimate ŝ

Considering now FIGS. 9-12, there is provided the results of simulations that allow comparisons of the exemplary architecture and the prior art methods with respect to the uncoded Bit Error Rate (BER) for a Quadrature Phase Shift Keying (QPSK) modulation.

For the sake of clarity, the following references are used for all figures:

Reference 101 (P-MMSE-PIC MMSE-comb) shows the Bit Error Rate (BER) in the case of an iterative OFDM receiver exactly as described in FIG. 8 where the combining weights are chosen according to an MMSE criterium.

Reference 102 (P-MMSE-PIC simple comb) shows the BER in the case of n iterative OFDM receiver exactly as described in FIG. 8 where the combining weights are all equal to one and referred as "simple combining".

Reference 103 (MF-HD-PIC) shows the BER in the case of an iterative OFDM receiver exactly as described in FIG. 7 where the combining weights are substituted by hard-decisions, i.e. the sign of the intermediate decoded signals are only retained.

Reference 104 (MF-PE-Muller) shows the BER in the case of an iterative OFDM receiver exactly as described in FIG. 7 where the combining weights are computed according to the Mueller Polynomial Expansion formula.

Reference 105 shows the Block Error Rate in the case of the use of a full-MMSE method which, as known by the skilled man, provides the best results.

Reference 106 (ZFinvApproxMat1) shows the BER in the situation to a receiver that iteratively approximates the inverse of the frequency-domain channel matrix FxHxFH according to Mc Laurin expansion. This BER performance is used as a reference of alternative feasible iterative technique known to the man skilled in the art.

Reference 107 (ZfinvApproxMat2) shows the BER in the situation of to a receiver that iteratively approximates the inverse of the frequency-domain channel matrix FxHxFH according to Newton expansion formula. This BER performance is used as a reference of alternative feasible iterative technique known to the man skilled in the art.

It can be seen that the embodiments propose a general framework for an OFDM receiver where a BEM is adopted to allow effective preconditioning for fast-converging iterative ICI cancellation algorithms, in both time and frequency domains, which provide nearly optimal performances for the desired signal detection with limited complexity. The particular structure of the proposed algorithms lends itself to a modular and scalable architecture implementation where complexity can be further reduced at the expense of minor performance losses.

The following advantages have been discovered:
Nearly optimal performances with linearly bounded complexity;
Fast-converging iterative interference cancellation algorithms thanks to suited use of BEM based preconditioning
Modular recursive algorithms structure for modular and scalable architecture implementation; and
Architecture ready for BEM based channel estimation, The use of the proposed architectures shows that:
1. Windowing techniques are re-interpreted and generalized under the framework of the Basis Expansion Modeling (BEM) of the time-varying channel.
2. The general framework provided by the BEM allows effective preconditioning for fast-converging iterative ICI cancellation algorithms, in both time and frequency domains, which provide nearly optimal performances for the desired signal detection
3. The newly introduced pre-conditioned iterative interference cancellation algorithms have limited bounded complexity (linear with the OFDM block size)
4. From a practical implementation viewpoint, the newly introduced pre-conditioned iterative interference cancellation algorithms recursive structure lends itself to a modular and flexible architecture where complexity can be even more significantly reduced at the expense of minor performance losses
5. The BEM general framework along with the preconditioned fast-converging iterative ICI cancellation, provides also means for low complexity accurate channel estimation resulting in even better desired signal detection performances
6. The proposed algorithms can be used in combination with channel decoding, in particular with turbo decoding for fast converging so-called turbo-equalization (shown to perform close to the perfect-interference-cancellation bound)
7. The invention provides a general framework to consistently describe and compare most known receiver techniques. Analytical and numerical results will be provided to this end.

The invention claimed is:

1. An Orthogonal Frequency Division Multiplexing (OFDM) receiver for processing an OFDM received signal and adapted to perform OFDM reception in the presence of Doppler, the OFDM receiver comprising:
a subtractor configured to receive a first input comprising the received signal and a second input from a feedback loop, the feedback loop receiving a feedback signal from an output, the subtractor further providing a subtractor output to the input of at least two parallel processing chains;
a linear multipath equalizer and detector configured to receive outputs of the parallel processing chains, the linear multipath equalizer and detector configured to output an estimation of a sequence of transmitted data, wherein the estimation of the sequence of transmitted data is the output, the feedback loop further comprising:
an Inverse Fast Fourier Transform (IFFT) block; and a block corresponding to an estimated channel (H) of the propagation channel;
the subtractor output comprising at least two parallel processing chains each of the at least two parallel processing chains comprising:
a time domain windowing processor configured to process an OFDM block, the time domain windowing processor comprising an element by element multiplication of the OFDM block, by a set of predetermined coefficients; and
a Discrete Fourier Transform (DFT) block configured to demodulate a windowed OFDM symbol from the OFDM block into its frequency domain equivalent;
wherein the time domain windowing of the at least two parallel processing chains comprise complimentary profiles so as to avoid any loss of information throughout the OFDM signal.

2. The OFDM receiver according to claim 1, wherein the linear multipath equalizer and detector further comprises a multipath decision feedback equalization module.

3. The OFDM receiver according to claim 1, wherein the linear multipath equalizer and detector comprises a multipath MMSE equalizer.

4. The OFDM receiver according to claim 1, wherein the linear multipath equalizer and detector comprises a turbo code detector adapted to decode data before the data is output and provided to the feedback loop.

5. The OFDM receiver according to claim 1, wherein the OFDM receiver is incorporated into a Long Term Evolution (LTE) terminal equipment.

6. The OFDM receiver according to claim 1, wherein the OFDM receiver is incorporated into a mobile communication device.

7. A mobile communication device comprising an Orthogonal Frequency Division Multiplexing (OFDM) mobile terminal receiver, the OFDM mobile terminal receiver comprising:
a subtractor configured to receive a first input that comprises a received signal of the mobile communication device and a second input configured to receive a feedback signal from a feedback loop, the feedback loop receives a feedback signal from an output of a linear multipath equalizer and detector, the subtractor further configured to provide a subtractor output that provides data to the inputs of at least two parallel processing chains;
a linear multipath equalizer and detector configured to receive the outputs of the parallel processing chains, and wherein the output of the linear multipath equalizer and detector is an estimation of a sequence of a transmitted data;
the feedback loop comprising an Inverse Fast Fourier Transform (IFFT) block; and a block corresponding to an estimated channel (H) of the propagation channel;
the subtractor output comprising at least two parallel processing chains, each of the at least two parallel processing chains comprising:
a time domain windowing process configured to process an OFDM block, the time domain windowing process comprising multiplying, element by element of the OFDM block, by a set of predetermined coefficients; and a Discrete Fourier Transform (DFT) block configured for demodulating windowed OFDM symbols in a frequency domain equivalent; the time domain windowing process of the at least two parallel processing chains comprising complimentary profiles so as to avoid a loss of information through an OFDM signal.

8. A method of processing an Orthogonal Frequency Division Multiplexing (OFDM) received signal that is adapted to perform OFDM reception in the presence of Doppler, the method comprising:

subtracting a feedback signal from a received signal in the time domain to produce a subtractor output, the feedback signal being provided from a feedback loop comprising an Inverse Fast Fourier Transform (IFFT) block and a channel estimate (H) block;

inputting the subtractor output into at least two parallel processing chains, wherein each processing chain comprises:

windowing, by multiplying, on an element by element basis, each element of a received OFDM block by a set of predetermined coefficients to provide a windowed OFDM symbol, the multiplying being performed in a time domain windowing block, the windowing of the at least two parallel processing chains comprising a complimentary profile so as to avoid a loss of information throughout an OFDM block; and         demodulating the windowed OFDM symbol into a frequency domain equivalent;

receiving, by a linear multipath equalization and detection block, parallel processing chain outputs from the at least two parallel processing chains;

applying a linear multipath equalization and detection process to the received parallel processing chain outputs in order to generate an estimate of a transmitted sequence; and     providing the estimate of the transmitted sequence as a feedback loop input to the feedback loop.

\* \* \* \* \*

UNITED STATES PATENT AND TRADEMARK OFFICE
CERTIFICATE OF CORRECTION

PATENT NO. : 8,824,539 B2  Page 1 of 1
APPLICATION NO. : 13/256414
DATED : September 2, 2014
INVENTOR(S) : Andrea et al.

It is certified that error appears in the above-identified patent and that said Letters Patent is hereby corrected as shown below:

On the title page item [54], and in the specification, column 1, line 3, Title, delete "DOOPPLER" and insert therefor --DOPPLER--.

Signed and Sealed this
Fifth Day of April, 2016

Michelle K. Lee
*Director of the United States Patent and Trademark Office*